(12) United States Patent
Machado et al.

(10) Patent No.: US 12,495,121 B2
(45) Date of Patent: Dec. 9, 2025

(54) METHOD FOR A CAMERA SYSTEM, AND CAMERA SYSTEM

(71) Applicant: Continental Autonomous Mobility Germany GmbH, Ingolstadt (DE)

(72) Inventors: Gustavo Machado, Blaustein (DE); Andreas Panakos, Stuttgart (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 23 days.

(21) Appl. No.: 18/293,015

(22) PCT Filed: Jul. 1, 2022

(86) PCT No.: PCT/DE2022/200148
§ 371 (c)(1),
(2) Date: Jan. 29, 2024

(87) PCT Pub. No.: WO2023/006157
PCT Pub. Date: Feb. 2, 2023

(65) Prior Publication Data
US 2024/0259519 A1    Aug. 1, 2024

(30) Foreign Application Priority Data
Jul. 29, 2021   (DE) ...................... 10 2021 208 235.1

(51) Int. Cl.
*H04N 5/272* (2006.01)
*B60R 1/27* (2022.01)
(Continued)

(52) U.S. Cl.
CPC ............... *H04N 5/272* (2013.01); *B60R 1/27* (2022.01); *G06T 5/20* (2013.01); *G06T 5/50* (2013.01);
(Continued)

(58) Field of Classification Search
CPC ........... H04N 5/272; G06T 7/136; G06T 7/13; G06T 7/174; G06T 2207/20212;
(Continued)

(56) References Cited

U.S. PATENT DOCUMENTS 6,055,340 A * 4/2000 Nagao ....................... G06T 5/75
382/266
6,912,301 B1 * 6/2005 Lin .......................... G09B 21/00
382/128

(Continued)

FOREIGN PATENT DOCUMENTS

DE    102009029439 A1    3/2011
WO    2011060525 A1    5/2011

OTHER PUBLICATIONS

German Search Report dated Jun. 10, 2022 for the priority German Patent Application No. 10 2021 208 235.1.

(Continued)

*Primary Examiner* — Brian P Yenke
(74) *Attorney, Agent, or Firm* — Fitch, Even, Tabin & Flannery LLP

(57) ABSTRACT

The present disclosure relates to a method for a camera system, in particular a surround-view camera system, for a vehicle, which has a control device, multiple surround-view cameras, and a display apparatus. The method includes: generating an original image (step I), generating a simulated image of the original image, the simulated image simulating a coloration of the original image resulting from an ascertainable visual impairment, generating a differential image between the original image and the simulated image, determining edges in the differential image, generating a superimposed image by superimposing the original image and the edges of the differential image, and displaying the superimposed image using the display apparatus.

11 Claims, 2 Drawing Sheets

(51) Int. Cl.
| | |
|---|---|
| *G06T 5/20* | (2006.01) |
| *G06T 5/50* | (2006.01) |
| *G06T 5/70* | (2024.01) |
| *G06T 7/13* | (2017.01) |
| *G06T 7/136* | (2017.01) |
| *G06T 7/174* | (2017.01) |
| *G06V 20/56* | (2022.01) |

(52) U.S. Cl.
CPC ............. *G06T 5/70* (2024.01); *G06T 7/13* (2017.01); *G06T 7/136* (2017.01); *G06T 7/174* (2017.01); *G06V 20/56* (2022.01); *B60R 2300/105* (2013.01); *B60R 2300/20* (2013.01); *B60R 2300/303* (2013.01); *G06T 2207/10024* (2013.01); *G06T 2207/20212* (2013.01); *G06T 2207/30252* (2013.01)

(58) Field of Classification Search
CPC . G06T 2207/30252; G06T 2207/10024; B60R 1/27; B60R 2300/105; B60R 2300/20; B60R 2300/303; G06V 20/56
See application file for complete search history.

(56) References Cited

U.S. PATENT DOCUMENTS

| | | | | |
|---|---|---|---|---|
| 9,129,374 | B2* | 9/2015 | Xu | G06T 5/73 |
| 10,748,036 | B2* | 8/2020 | Tu | G06T 7/11 |
| 11,160,688 | B2* | 11/2021 | Cho | G06T 19/006 |
| 11,410,430 | B2* | 8/2022 | Buerker | G06V 20/58 |
| 11,948,277 | B2* | 4/2024 | Niu | G06T 7/13 |
| 2004/0136570 | A1* | 7/2004 | Ullman | G06T 5/75 |
| | | | | 382/114 |
| 2004/0156554 | A1* | 8/2004 | McIntyre | G06T 5/00 |
| | | | | 382/254 |
| 2011/0037877 | A1* | 2/2011 | Tamaru | H04N 23/958 |
| | | | | 382/254 |
| 2011/0157184 | A1* | 6/2011 | Niehsen | G06T 11/00 |
| | | | | 345/440 |
| 2013/0242101 | A1 | 9/2013 | Schneider et al. | |
| 2014/0010472 | A1* | 1/2014 | Xu | G06T 5/73 |
| | | | | 382/263 |
| 2016/0110892 | A1* | 4/2016 | Nett | A61B 6/52 |
| | | | | 600/407 |
| 2017/0345164 | A1* | 11/2017 | Guerreiro | G06T 7/97 |
| 2019/0378449 | A1 | 12/2019 | VanderWel | |
| 2020/0090322 | A1* | 3/2020 | Seo | G06N 3/084 |
| 2020/0372690 | A1 | 11/2020 | Silveria | |
| 2022/0101021 | A1* | 3/2022 | Neubecker | G06T 5/77 |
| 2023/0244307 | A1* | 8/2023 | Asher | G06V 20/20 |
| | | | | 345/156 |
| 2024/0037445 | A1* | 2/2024 | Huang | G06N 7/01 |
| 2024/0242451 | A1* | 7/2024 | Yu | G06T 7/70 |

OTHER PUBLICATIONS

The International Search Report and the Written Opinion of the International Searching Authority mailed on Oct. 17, 2022 for the PCT Application No. PCT/CE2022/200148 which this application claims priority.

Enrico Tanuwidjaja et al, "Chroma: A Wearable Augmented-Reality Solution for Color Blindness", Proceedings of the 2014 ACM International Joint Conference on Pervasive and Ubiquitous Computing. Sep. 2014, pp. 799-810, https://doi.org/10.1145/2632048.2632091.

M Ribeiro et al., "Contour Enhancement Algorithm for Improving Visual Perception of Deutan and Protan Dichromats", International Journal of Interactive Multimedia and Artificial Intelligence, vol. 5(No. 5):79, May/Jun. 2019, DOI: 10.9781/ijimai.2019.05.003.

BMW Group, "MINI Augmented Vision: A revolutionary display concept offering enhanced comfort and safety", Apr. 10, 2015, https://www.press.bmwgroup.com/global/article/detail/T0212042EN/mini-augmented-vision:-a-revolutionary-display-concept-offering-enhanced-comfort-and-safety-exclusive-prototype-of-augmented-reality-eyewear-underlines-the-innovative-flair-and-creativity-of-the-mini-brand?language=en.

Hans Brettel et al., "Computerized Simulation of Color Appearance for Dichromats", Journal of the Optical Society of America A-optics Image Science and Vision, Oct. 1997; vol. 14(No. 10): pp. 2647-2655.

* cited by examiner

METHOD FOR A CAMERA SYSTEM, AND CAMERA SYSTEM

CROSS-REFERENCE TO RELATED APPLICATIONS

The present application is a National Stage Application under 35 U.S.C. § 371 of International Patent Application No. PCT/DE2022/200148 filed on Jul. 1, 2022, and claims priority from German Patent Application No. 10 2021 208 235.1 filed on Jul. 29, 2021, in the German Patent and Trademark Office, the disclosures of which are herein incorporated by reference in their entireties.

TECHNICAL FIELD

The present disclosure relates to a method for a camera system or a surround-view camera system for capturing the environment for a vehicle as well as a generic camera system or a surround-view camera system. Thanks to the present disclosure, the user experience for people who have impaired color perception may be improved on any visualization system, in particular a camera-based surround-visualization system for vehicles. This is achieved by detecting objects (and/or edges) in images which have a loss of contrast due to a user-defined type of color blindness. Following the detection, these objects (and/or edges) can be highlighted in order to make them more visible to the user, as they are present in the surroundings of the vehicle, as a result of which the risk of accidents is reduced and, consequently, safety is increased.

BACKGROUND

Vehicles are increasingly being equipped with driver assistance systems which support the driver during the performance of driving maneuvers. In addition to radar sensors, lidar sensors, ultrasonic sensors and/or camera sensors, the driver assistance systems also include, in particular, surround-view camera systems which allow the vehicle surroundings to be displayed to the driver of the vehicle. As a general rule, such surround-view camera systems include multiple vehicle cameras which supply real images of the vehicle surroundings which are merged in particular by a data processing unit of the surround-view camera system to form an image of the vehicle surroundings. The image of the vehicle surroundings can then be displayed to the driver on a display unit (such as, e.g., the display of the navigation system). In this way, the driver can be supported during a vehicle maneuver, for example when reversing the vehicle or during a parking maneuver.

For surround-view systems as well as electronic mirror replacement systems, the camera images are either directly displayed in so-called "single views" or transformed in accordance with special processes in order to display fused views. These views are, e.g., a so-called "3D bowl" ("bowl view") or "top view" ("bird's eye view" or "plan view"), in which images or textures from the surround-view cameras are merged or seamlessly strung together (stitching). As a general rule, the images or textures of the surround-view cameras have overlapping areas or overlapping regions—in particular in the bowl view, in which the textures from the cameras are projected in order to visualize a virtual 3D bowl which represents the entire area around the car. Modern surround-view camera systems can then display the resulting, generated views or visualizations to the driver, e.g., on a (2D) display, a center or driver display in the cockpit or a navigation system. The captured camera textures can be represented in different ways. In particular, the textured images from the cameras can be projected onto a virtual 3D plane which visualizes the entire region around the car (in a 360-degree view), in the "top view."

In the case of current visualization functions, the coloration is of particular importance, since these can display a realistic image of the environment to the user and since particular color accents can be highlighted as a result, e.g., warning colors (red) on signs and other display apparatuses. As a general rule, color blindness (also called color vision deficiency or achromatopsia or achromasia), a color perception disorder or visual impairment which affects, e.g., a not inconsiderable part of the population in Europe, attracts less attention. The ability to distinguish between specific colors is impaired, wherein, as a general rule, only contrasts (light-dark) can be perceived. Objects which are clearly visible to people with normal color vision can therefore be less perceptible or, in some situations, even go completely unnoticed by people who are color blind. In road traffic, the risk of an accident can be increased, for example, because many road signs and safety warning signs use colors to inform drivers, which are then not reliably detected by a driver who has impaired color perception. In the same way, color differences in visualizations on displays, which are provided to the driver by generic driver assistance systems, cannot be sufficiently detected either.

A color modification system for a display module of a vehicle is known from US 2019 378 449 A1, wherein the display element can display color images and the colors of the color images are selectively modified. The colors of the color images can be selectively modified, based on a user's user profile, by image processing. Once a user profile linked to a color change regime is detected, color adjustments are made. The adjustments can be different, e.g., in terms of intensity or the like, for color-blind users, since users with different types and intensities of color blindness can react to different color adjustments.

The problem is to therefore provide a method for a (surround-view) camera system, which makes it possible to achieve improved visibility or fewer visibility restrictions in a simple and cost-effective manner, resulting in improvements in user-friendliness and safety.

SUMMARY

The aforementioned problem is addressed by the entire teaching of claim 1 as well as the alternative, independent claim. Expedient configurations of the present disclosure are claimed in the subclaims.

According to the present disclosure, a method for a camera system, in particular a surround-view camera system, for a vehicle for establishing borders or edges or transitions between color and/or contrast ranges which have a poor contrast for people who have dyschromatopsia, as well as the color highlighting thereof (which can be easily detected by people who have dyschromatopsia) is proposed. The camera system includes a control device and multiple surround-view cameras as well as a display apparatus and has the following method steps:
  generating an original image (step I),
  generating a simulated image of the original image (step II), the simulated image simulating a coloration of the original image resulting from an ascertainable visual impairment,
  generating a differential image between the original image and the simulated image (step III), determining edges in the differential image (step V),
generating a superimposed image by superimposing the original image and the edges of the differential image (step VI), and
displaying the superimposed image using the display apparatus (step VII).

This results in the advantage that it is possible to highlight image objects which could be difficult to detect for people who have color perception disorders. Consequently, the method according to the present disclosure provides users who have color perception disorders with an assistance function or a kind of visual aid which can activate visual feedback regarding objects which, due to their nature or condition, have, e.g., a loss of contrast for users who have color perception disorders. As a result, e.g., the risk of accidents may be particularly reduced in many situations, so that the present disclosure makes a very particular contribution in the field of driver assistance systems. Furthermore, the present disclosure may also be deployed in all areas in which images or visualizations are generated.

The differential image may be expediently smoothed following generation (step IV). As a result, edge detection may be carried out even more simply and more safely.

The differential image may be smoothed by means of a lowpass filter. However, all the other methods known from the prior art, with which the differential image can be smoothed, are also conceivable.

Furthermore, the differential image may be generated using color matching, brightness matching and/or contrast matching between the original image and the simulated image. The selection of the matching may be determined in particular by which type of simulated image was generated. For example, simulated images with shades of gray may be generated for people who have difficulties in terms of impaired color vision, or with tints of a single color for people who have visual disorders in terms of differentiating between light and dark.

The matching may take place pixelwise, i.e., pixel by pixel. Alternatively, regions of the same/similar color or with the same/similar contrast may also be pooled or clustered and compared. This can save computing capacity. In addition, this results in a particularly simplified and accelerated method.

According to an example configuration of the present disclosure, the edges in the differential image may be determined using a threshold, wherein the threshold represents an ascertainable color difference and/or an ascertainable brightness difference between the original image and the simulated image.

Furthermore, relevant objects and/or relevant edges may be established using the differential image, e.g., by capturing large or particularly striking differences (large areas, significant differences in contrast and the like).

In addition, an environment detection may be provided, e.g., by the camera system but also by other sensors such as, e.g., radar, lidar or ultrasonic sensors, with which relevant objects may be detected in the environment of the vehicle. Using the data, it may also be established whether the objects/edges are relevant objects/edges which should additionally be displayed to the user or not.

Only the edges of relevant objects may also be expediently determined and/or displayed. The fact that only the relevant edges (that is to say, those which are difficult to detect for those who have dyschromatopsia) in the differential image are compared results in a faster identification compared to the identification of all of the edges in the original image, which, in turn, may compensate for any time required for creating the two additional images. As a result, the algorithm for edge detection in the original image—in particular with regard to the real-time requirement—may particularly be designed to be more efficient. As soon as objects and/or edges are detected, various forms of highlighting the information for the user are possible, e.g., by intensifying the color brightness with a certain transparency in the areas, in order to draw the driver's attention without causing a distraction.

In alternative, independent claims or subclaims, the present disclosure also includes a camera system, in particular a surround-view camera system, for a vehicle, which has a control device, multiple surround-view cameras, and a display apparatus. The camera system is designed to generate a superimposed image using the method according to the present disclosure and to display it on the display apparatus.

The present disclosure may be easily deployed for all known types of visual impairments, in particular color vision impairment or color blindness, wherein, within the meaning of the present disclosure, all of the typical variants may be subsumed under the terms color vision impairment or color blindness such as, e.g., abnormal trichromatism, monochromatism or dichromasy, as well as any subtypes such as, e.g., the subtypes of abnormal trichromatism (protanomaly, deuteranomaly or tritanomaly) or the subtypes of dichromasy (protanopia, deuteranopia or tritanopia).

BRIEF DESCRIPTION OF THE DRAWINGS

Description of the Invention with Reference to Exemplary Embodiments

The invention is explained in greater detail below with reference to expedient exemplary embodiments, wherein.

DETAILED DESCRIPTION

Figure 1:
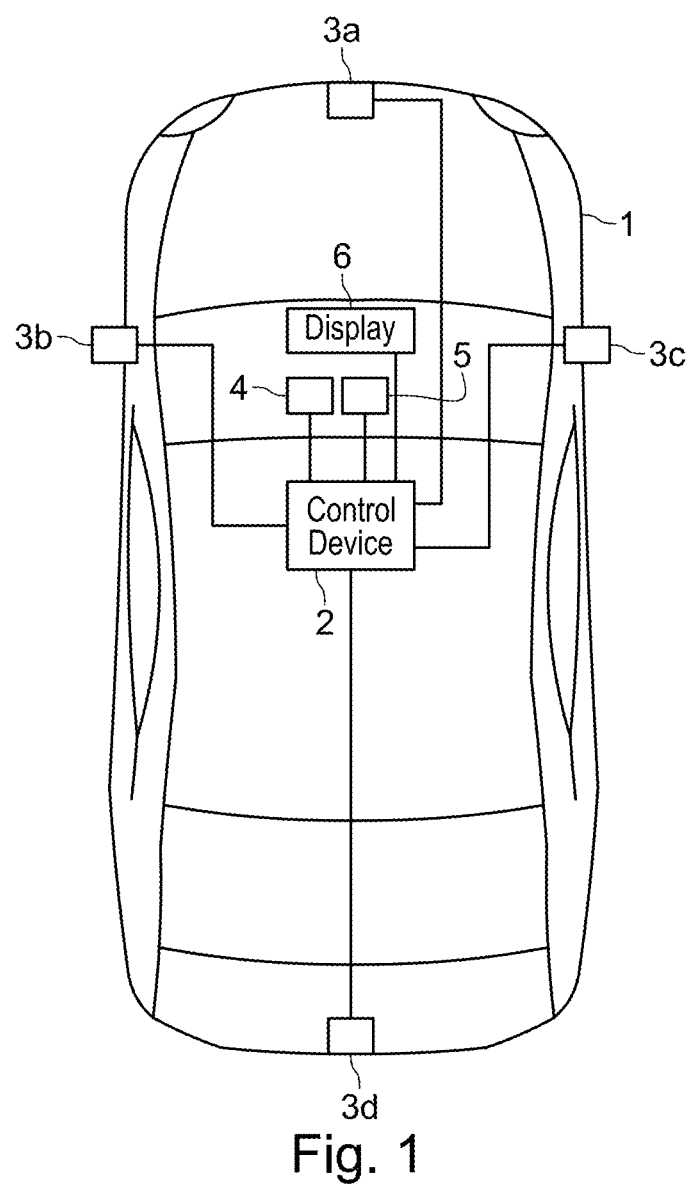
FIG. 1 shows a simplified schematic representation of a vehicle having a surround-view camera system according to the present disclosure for generating an image of the vehicle surroundings.

Reference numeral 1 in FIG. 1 designates a vehicle having a control device 2 (ECU, Electronic Control Unit or ADCU, Assisted and Automated Driving Control Unit), which may have recourse to various actuators (e.g., steering, engine, brake) of the vehicle 1 in order to be able to carry out control processes of the vehicle 1. Furthermore, the vehicle 1 has multiple surround-view cameras 3*a*-3*d*, a front camera 4 (e.g., a stereo camera or the like) and a lidar sensor 5, which are controlled via the control device 2, for capturing the environment. However, the present disclosure also expressly includes configurations in which no common control device 2 is provided, but rather individual control devices or control units for controlling the sensors are provided (e.g., a separate control unit or a separate controller for controlling the cameras 3*a*-3*d* and for performing the method according to the invention). Moreover, further sensors such as, e.g., (a) radar sensor(s) and/or (an) ultrasonic sensor(s) may also be provided. The sensor data may then be utilized in order to detect the environment and objects. As a consequence, various assistance functions such as, e.g., parking assistants, Electronic Brake Assist (EBA), Adaptive Cruise Control (ACC), a Lane Departure Warning System or a Lane Keep Assist (LKA) or the like may be realized. In a practical manner, the assistance functions may likewise be carried out via the control device 2 or a separate control device.

The cameras 3a-3d are part of a (surround-view) camera system which is controlled by the control device 2 (alternatively, e.g., a separate control may be provided), which offers a complete 360-degree view around the entire vehicle 1 by combining the fields of view of the individual cameras, e.g., 120 degrees, to form an overall view or overall image. By simply monitoring the entire surroundings, e.g., including the blind spot, this camera system has numerous advantages in many everyday situations. Various viewing angles of the vehicle 1 may be represented to the driver by the camera system, e.g., via a display device 6 (e.g., a display, a cockpit display, a head-up display, navigation system, onboard computer or the like). As a general rule, four surround-view cameras 3a-3d are used, which may be arranged, e.g., in the front and back region as well as on the side mirrors (as depicted). In addition, three, six, eight, ten or more surround-view cameras may, however, also be provided. These camera views or viewing angles are particularly helpful when checking the blind spot, changing lanes or parking.

The camera system according to the present disclosure may detect edges despite the loss of contrast (e.g., due to the user's defective color vision) and make it (better) visible to the user. This makes it possible to compare the original image with the simulated image and to analyze the loss of contrast in some regions of the image.

According to the present disclosure, the edges may be detected by first calculating a simulated image which simulates the perception of the original image of individuals who have the selected type of color blindness. Following this, the difference between the original image and the simulated image may be calculated, e.g., the difference between each corresponding pixel and the respective color component. Thereafter, the resulting differential image from the previous step may be smoothed, e.g., with a lowpass filter. The spatial gradient of the resulting image may then be calculated from this step, wherein the height of the color gradient can, in turn, be calculated therefrom for each pixel of the resulting image. Furthermore, a threshold for the subdivision of pixels is then used to determine whether it is an edge pixel or a non-edge pixel. Edge pixels may then be colorized or blackened, which is then superimposed, e.g., on the displayed image in order to display the edges to the user. Consequently, it is easily possible to avoid losses of information or contrast through the image mask. Furthermore, this procedure may be deployed for all generic edge detection algorithms or these could be adapted accordingly by the procedure.

Figure 2:
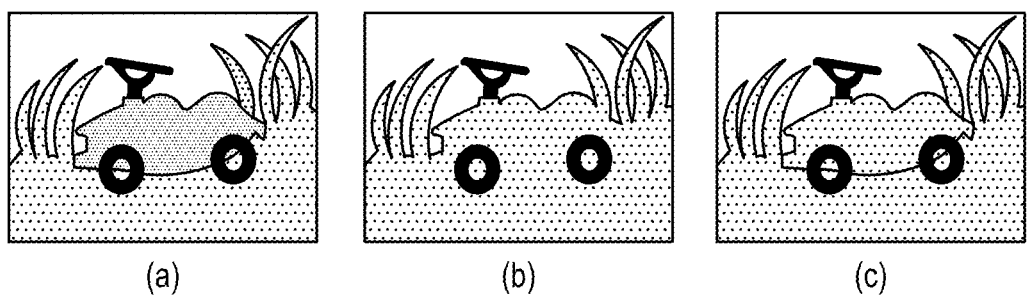
FIG. 2 shows a simplified schematic representation of the display of an exemplary scene, for which a visualization is generated, in accordance with the method steps according to the present disclosure, wherein (a) the scene in the original shows: a toy car in the grass, (b) the simulation of a perception of a person who has impaired color perception and (c) an exemplary representation with detected and represented edges on the toy car.
Figure 3:
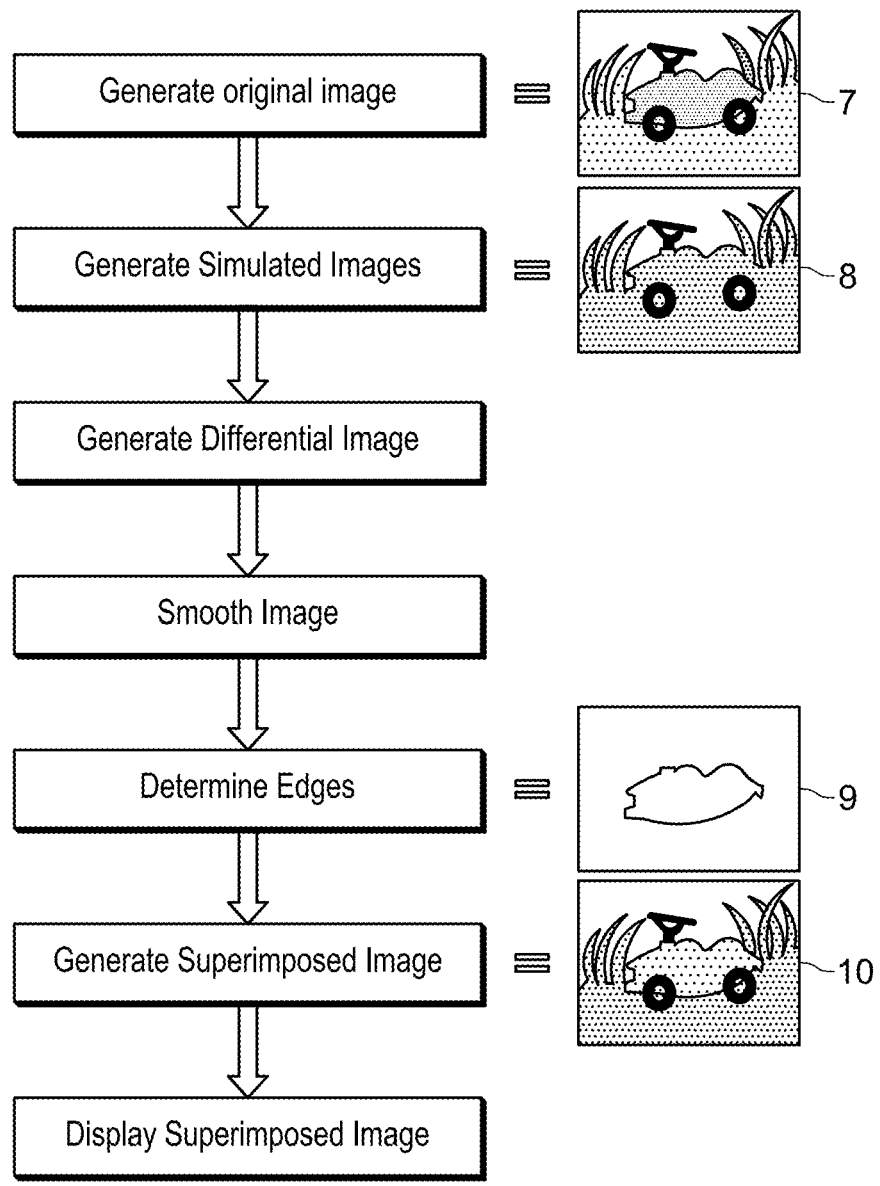
FIG. 3 shows a simplified schematic representation of a configuration of the course of the method according to the present disclosure.

A simplified schematic representation of the display of an exemplary scene in the original, for which a visualization is generated, is depicted in FIG. 2(a). The scene shows a red toy car (wherein red is represented as dark gray) in the green grass (wherein green is represented as light gray). In FIG. 2(b), the simulation of a perception of a person who has impaired color perception (or "red-green visual impairment") is depicted, wherein the colors red and green cannot be sufficiently distinguished, but are substantially perceived as one hue. It becomes apparent that the edges of the toy car "blur", as a result of which said toy car may no longer be clearly delimited as such from the surroundings. Such effects or detection restrictions may have an adverse effect, e.g., in road traffic. These disadvantages may now be overcome using the course of a method according to the present disclosure, as depicted by way of example in FIG. 3. In order to circumvent these disadvantages, an original image 7 is first acquired (step I) and a simulated image 8, as shown in FIG. 2(b), is generated or calculated (step II). A differential image 9 is subsequently generated (step III) using color matching of the corresponding pixels in the original image 7 and in the image 8, which may be smoothed, if necessary (step IV), e.g., by means of a lowpass filter. Following this, the edges in the differential image may be determined via an edge detection algorithm (step V), wherein this may be determined, e.g., by means of a threshold, wherein, e.g., in the event that it is determined that the color value in the differential image 9 has been exceeded, an edge or a color change (or a change in brightness and/or contrast) and, consequently, an edge pixel may be extrapolated. Following this, the original image 7 and the edges from the differential image 9 may be superimposed (step VI), wherein the edges may be, e.g., colorized in a high-contrast color which may be easily detected by the user, or black. The superimposed image 10 thus generated may be subsequently displayed to the user via the display device 6 (step VII), so that the latter may then easily detect the edges of the respective objects, as also shown in FIG. 2(c) using the black border of the toy car.

LIST OF REFERENCE NUMERALS

1 Vehicle
2 Control device
3a-3d Cameras
4 Front camera
5 Lidar sensor
6 Display apparatus
7 Original image
8 Simulated image
9 Differential image
10 Superimposed image

The invention claimed is:
1. A method for a camera system, in particular a surround-view camera system, for a vehicle, which has a control device, multiple surround-view cameras, and a display apparatus, the method comprising:
generating, by a camera of the multiple surround-view cameras, an original image,
generating, by at least one control device, each control device comprising at least one electronic control unit, at least one ADCU or at least one controller, a simulated image of the original image, the simulated image simulating a coloration of the original image resulting from an ascertainable visual impairment, the simulated image being separate and distinct from the original image,
generating, by the control device, a differential image between the original image and the simulated image,
determining, by the control device, edges in the differential image,
generating, by the control device, a superimposed image by superimposing the original image and the edges of the differential image, the superimposed image being separate and distinct from the original image and the simulated image, and displaying the superimposed image using the display apparatus.

2. The method according to claim 1, further comprising smoothing, by the control device, the differential image following generation thereof.

3. The method according to claim 2, wherein the differential image is smoothed using a lowpass filter.

4. The method according to claim 1, wherein the differential image is generated using at least one of color matching, brightness matching or contrast matching.

5. The method according to claim 4, wherein the at least one of color matching, brightness matching or contrast matching is carried out pixelwise.

6. The method according to claim 1, wherein the edges in the differential image are determined using a threshold, wherein the threshold represents at least one of an ascertainable color difference or an ascertainable brightness difference between the original image and the simulated image.

7. The method according to claim 6, wherein only edges of relevant objects are at least one of determined or displayed.

8. The method according to claim 1, further comprising establishing, by the control device, at least one of relevant objects or relevant edges using the differential image.

9. The method according to claim 1, further comprising providing environment detection which detects relevant objects in an environment of the vehicle.

10. A surround-view camera system for a vehicle, having the control device, the multiple surround-view cameras and the display apparatus, wherein the surround-view camera system is configured to generate the superimposed image using the method according to claim 1.

11. A camera system for a vehicle, comprising:
a control device comprising at least one control device, each control device comprising at least one electronic control unit, at least one ADCU or at least one controller configured to
receiving an original image from a camera disposed on a vehicle,
generating a simulated image of the original image, the simulated image simulating a coloration of the original image resulting from an ascertainable visual impairment, the simulated image being separate and distinct from the original image,
generating a differential image between the original image and the simulated image,
determining edges in the differential image,
generating a superimposed image by superimposing the original image and the edges of the differential image, the superimposed image being separate and distinct from the original image and the simulated image, and
sending to a display apparatus the superimposed image for display on the display device.

* * * * *